(12) United States Patent
Singamsetti et al.

(10) Patent No.: US 9,374,788 B2
(45) Date of Patent: Jun. 21, 2016

(54) MOBILE DEVICE PERIPHERAL

(71) Applicant: SanDisk Technologies Inc., Plano, TX (US)

(72) Inventors: Satya Singamsetti, Fremont, CA (US); Gautham Reddy, San Jose, CA (US)

(73) Assignee: SanDisk Technologies Inc., Plano, TX (US)

(*) Notice: Subject to any disclaimer, the term of this patent is extended or adjusted under 35 U.S.C. 154(b) by 0 days.

(21) Appl. No.: 14/134,679

(22) Filed: Dec. 19, 2013

(65) Prior Publication Data

US 2015/0181413 A1    Jun. 25, 2015

(51) Int. Cl.
*H04Q 7/10* (2006.01)
*H04W 52/02* (2009.01)
*H04M 1/02* (2006.01)
*H04M 1/725* (2006.01)
*H04M 1/18* (2006.01)

(52) U.S. Cl.
CPC ........ *H04W 52/0261* (2013.01); *H04M 1/0256* (2013.01); *H04M 1/7253* (2013.01); *H04M 1/185* (2013.01)

(58) Field of Classification Search
CPC   G06F 3/0679; H04W 4/008; H04W 52/0261; H02B 1/056
USPC ........ 455/41.2, 557, 575.8; 361/600; 711/115
See application file for complete search history.

(56) References Cited

U.S. PATENT DOCUMENTS

| | | | | |
|---|---|---|---|---|
| 7,832,645 | B2* | 11/2010 | Chen et al. | 235/492 |
| 8,483,758 | B2* | 7/2013 | Huang | 455/557 |
| 8,521,956 | B2* | 8/2013 | Della Pia et al. | 711/115 |
| 8,864,019 | B2* | 10/2014 | Hashimoto | G06F 17/30265 235/375 |
| 2008/0293274 | A1* | 11/2008 | Milan | 439/171 |
| 2009/0096413 | A1 | 4/2009 | Partovi et al. | |
| 2009/0152361 | A1* | 6/2009 | Narendra et al. | 235/492 |
| 2009/0287636 | A1* | 11/2009 | Ren et al. | 707/1 |
| 2011/0050164 | A1 | 3/2011 | Partovi et al. | |
| 2011/0175461 | A1 | 7/2011 | Tinaphong | |
| 2011/0185098 | A1* | 7/2011 | Kim et al. | 710/301 |
| 2011/0241607 | A1 | 10/2011 | Wiegers | |

(Continued)

OTHER PUBLICATIONS

SanDisk Connect—Wireless Media Drive & Wireless Flash Drive, http://www.sandisk.com/products/wireless/, 1 page, printed Nov. 14, 2013.

(Continued)

*Primary Examiner* — Patrick Edouard
*Assistant Examiner* — Julio Perez
(74) *Attorney, Agent, or Firm* — Brinks Gilson & Lione

(57) ABSTRACT

A mobile device peripheral is provided comprising a wireless memory sub-system configured for carrying out wireless data communications with a mobile device. The mobile device peripheral also has a battery configured to provide power to the wireless memory sub-system and a housing configured to hold the wireless memory sub-system and battery. The housing is further configured to physically attach the mobile device peripheral to the mobile device so that the mobile device peripheral and mobile device are carryable together as a single unit. The mobile device peripheral can take the form of a mobile device case or cover, for example. In another embodiment, the mobile device peripheral has a power splitter configured to split power received from a power connector to charge both the battery of the mobile device peripheral and the battery of the mobile device.

21 Claims, 8 Drawing Sheets

(56) References Cited

U.S. PATENT DOCUMENTS

2012/0287231 A1 11/2012 Ravi et al.
2013/0301522 A1 11/2013 Krishna et al.

OTHER PUBLICATIONS iExpander—An Expansion Drive for your iPhone, http://www.kickstarter.com/projects/108290897/iexpander-an-expansion-device-for-your-iphone-4-an, 24 pages, printed Nov. 14, 2013.

"Wireless Power Transfer," U.S. Appl. No. 13/565,472, filed Aug. 2, 2012, inventors: Gregory Stevens and Rongzhi Xing.

Office Action for U.S. Appl. No. 13/565,472 dated Nov. 5, 2015, 14 pages.

Cooper, D., "D-Link's All in One Mobile Companion is Gonna Lighten the Load of Your Checked Baggage", http://www.engadget.com/2012/01/10/d-link-all-in-one-mobile-companion/&ie=UTF-8&oe=UTF-8, Jan. 10, 2012, 6 pages.

"D-Link User Manual All-in-one Mobile Companion DIR-505", http://www.dlink.com/-/media/Consumer_Products/DIR/DIR%20505/Manual/DIR_505_Manual_US.pdf, Version 1.0, Mar. 29, 2012, D-Link Systems, Inc., 200 pages.

"SharePort Medical Companion DIR-505", http://www.dlink.com/us/en/home-solutions/connect/portable-routers/dir-505-shareport-mobile-companian, D-Link Systems, Inc., printed Aug. 5, 2013, 15 pages.

\* cited by examiner

MOBILE DEVICE PERIPHERAL

BACKGROUND

In many instances, once a user purchases a mobile device, he usually does not have the ability to add additional memory to it. For example, mobile devices, such as Apple's iPhone and iPad, do not have inputs for external memory cards to expand the memory capacity of the device, so the user is limited by the mobile device's native memory capacity. If the user realizes later that he needs more memory, he needs to spend the money to upgrade to a mobile device with more memory. To avoid running out of memory, the user can purchase a larger-memory-capacity mobile device in the first place, but the user would need the foresight to know what his future memory usage will be. Also, the larger-memory-capacity mobile device may not be a good value for the consumer, since mobile device manufacturers often charge a premium for the additional memory. Further, since the additional memory is embedded in the mobile device, the user cannot share the memory with multiple devices or transfer the memory to a new mobile device that the user later purchases. Another way for a user to deal with limited memory on a mobile device is to store data on the cloud. However, many users prefer not to store private data on the cloud. Additionally, data on the cloud is not always available to the user, and, even when it is available, it may not be quickly accessible. Plus, there are often additional costs associated with storing data on the cloud (e.g., storage and network data plan fees).

OVERVIEW

Embodiments of the present invention are defined by the claims, and nothing in this section should be taken as a limitation on those claims.

By way of introduction, in one embodiment, a mobile device peripheral is provided comprising a wireless memory sub-system configured for carrying out wireless data communications with a mobile device. The mobile device peripheral also has a battery configured to provide power to the wireless memory sub-system and a housing configured to hold the wireless memory sub-system and battery. The housing is further configured to physically attach the mobile device peripheral to the mobile device so that the mobile device peripheral and mobile device are carryable together as a single unit. The mobile device peripheral can take the form of a mobile device case or cover, for example. In another embodiment, the mobile device peripheral has a power splitter configured to split power received from a power connector to charge both the battery of the mobile device peripheral and the battery of the mobile device.

Other embodiments are possible, and each of the embodiments can be used alone or together in combination. Accordingly, various embodiments will now be described with reference to the attached drawings.

DETAILED DESCRIPTION OF THE PRESENTLY

Preferred Embodiments

Figure 1:
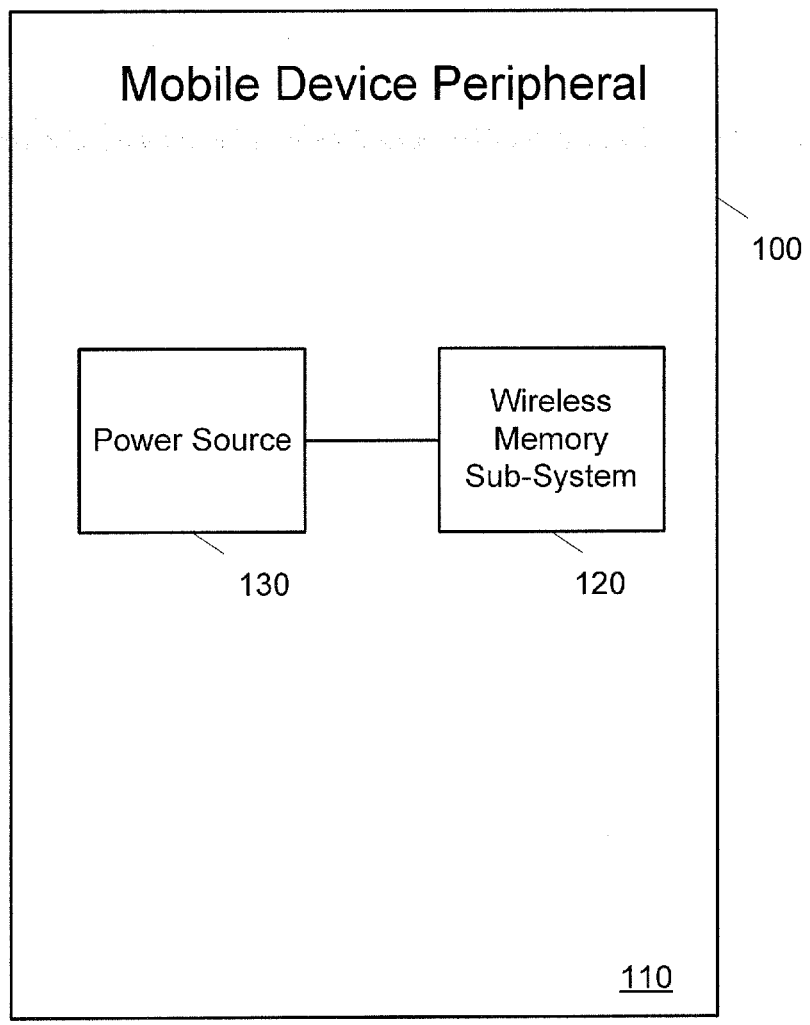
FIG. 1 is a block diagram of a mobile device peripheral of an embodiment.
Figure 2:
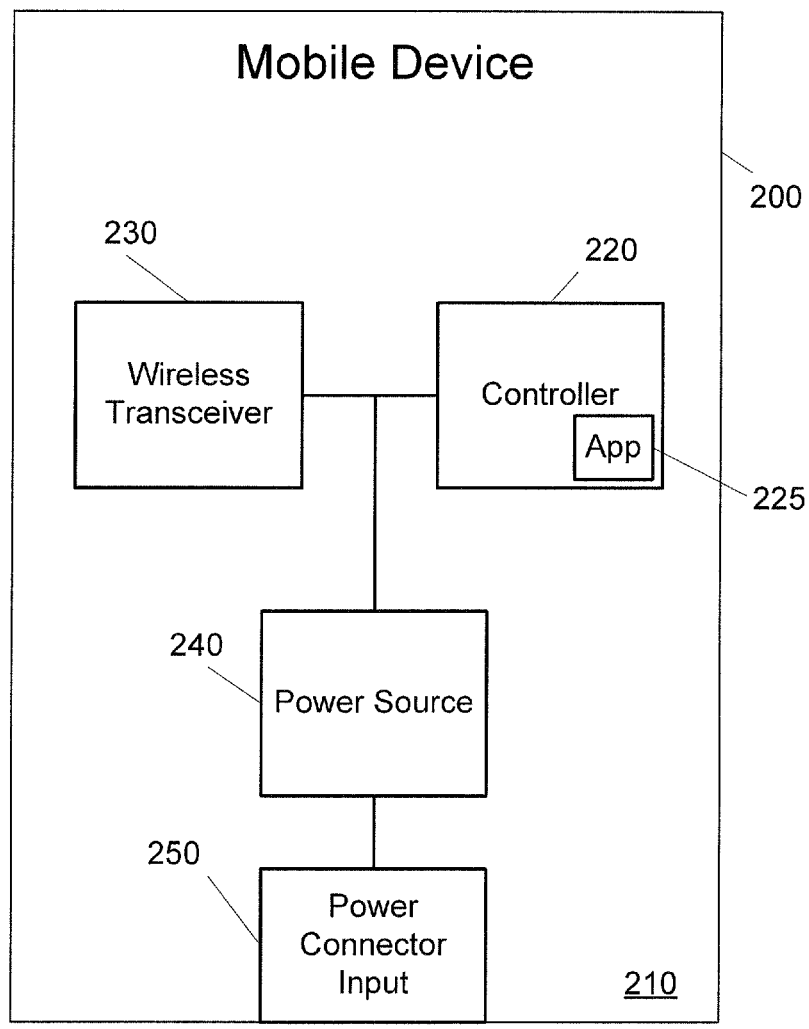
FIG. 2 is a block diagram of a mobile device of an embodiment.

Turning now to the drawings, FIG. 1 is a block diagram of a mobile device peripheral 100 of an embodiment. As shown in FIG. 1, the mobile device peripheral 100 of this embodiment comprises a housing 110 that carries a wireless memory sub-system 120 configured to wirelessly communicate data between the wireless memory sub-system 120 and a mobile device 200, such as a smart phone or tablet (FIG. 2). The housing 110 also carries a power source 130 (e.g., a battery) configured to provide power to the wireless memory sub-system 120 and, optionally, to the mobile device 200. In this embodiment, the housing 110 is configured to physically attach the mobile device peripheral 100 to the mobile device 200 so that mobile device peripheral 100 and mobile device 200 are carryable together as a single unit. The mobile device peripheral 100 can be, for example, a case or cover for the mobile device 200.

The mobile device 200 is a computing device that is easily carryable by an average user. The mobile device 200 can take any suitable form, such as, but not limited to, a smart phone (e.g., an Apple iPhone, an Android phone), a tablet (e.g., an Apple iPad), a "phablet," a book reader (e.g., an Amazon Kindle), a digital media player (e.g., an iPod), a game device, a personal digital assistant (PDA), a laptop, a wearable computer (e.g., a smart watch or Google Glasses), and any other mobile device where access to additional memory may be desired. FIG. 2 illustrates some exemplary components of a mobile device 200 of an embodiment. As shown in FIG. 2, the mobile device 200 in this embodiment comprises a housing 210, a controller 220 that runs one or more applications (such as "app" 225), a wireless transceiver 230, a power source (e.g., a battery) 240, and a power connector input 250, which can also serve as a data port. (As used herein, a "power connector" or a "data connector" can convey power or data only, respectively, or both power and data. Similarly, a "power port" (or "power connector input") or a "data port" (or "data connector input") can receive power or data only, respectively, or both power and data.) The mobile device 200 can contain different or additional components, which are not shown in FIG. 2 to simplify the drawing. For example, if the mobile device 200 is a mobile smart phone, the mobile device 200 can include hardware and/or software components to make and place telephone calls. As another example, the mobile device 200 can contain other components, such as, but not limited to, a display device (which can be touch-sensitive), an audio output device (e.g., a speaker or a headphone jack), and a storage module. Of course, these are just some examples, and other implementations can be used.

Figure 3:
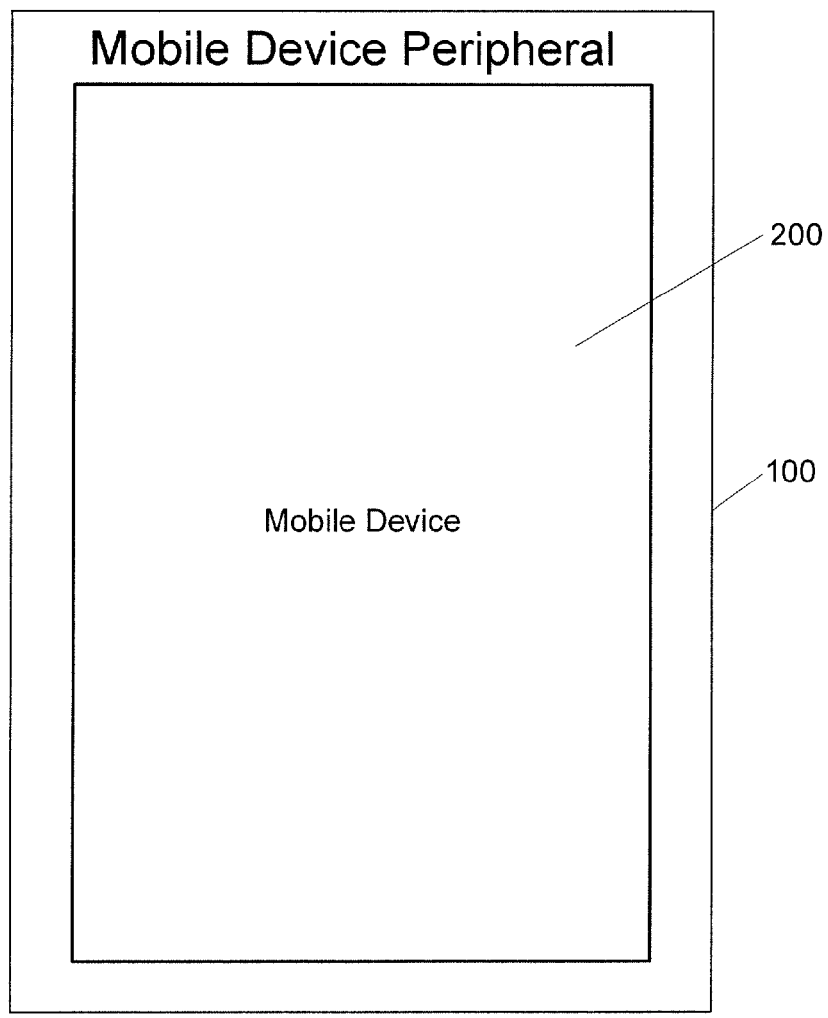
FIG. 3 is an illustration of an embodiment in which a mobile device peripheral is a case for a mobile device.

The housing 110 of the mobile device peripheral 100 can physically attach to the mobile device 200 is any suitable way and can depend on the design and type of the mobile device 100. For example, as shown in FIG. 3, the mobile device peripheral 100 can take the form of a case for the mobile device 200. In this example, the housing 110 of the case is configured to contact at least part of each of the surfaces of the mobile device 200. The case can be in the form of a "rail" case, where the housing 110 at least partially covers the side edges of the mobile device 200 and wraps around to grip the front and back portions of the mobile device 200. Alternatively, the case can cover the back of the mobile device 200 or can cover both the back and front of the mobile device 200, with the front portion of the housing 110 being at least partially removable (e.g., by flipping the front portion open) to expose the front of the mobile device 200 (e.g., to expose the mobile device's touch screen). In another embodiment, instead of being a "skin" that grips the mobile device 200, the case can contain an opening for the user to slide the mobile device 200 into the case. Other ways in which the housing 110 of the mobile device peripheral 100 can physically attach to the mobile device 200 include, but are not limited to, clipping the housing 110 onto the mobile device 200 and using magnets, adhesive, Velcro, etc. to make the attachment.

Figure 4:
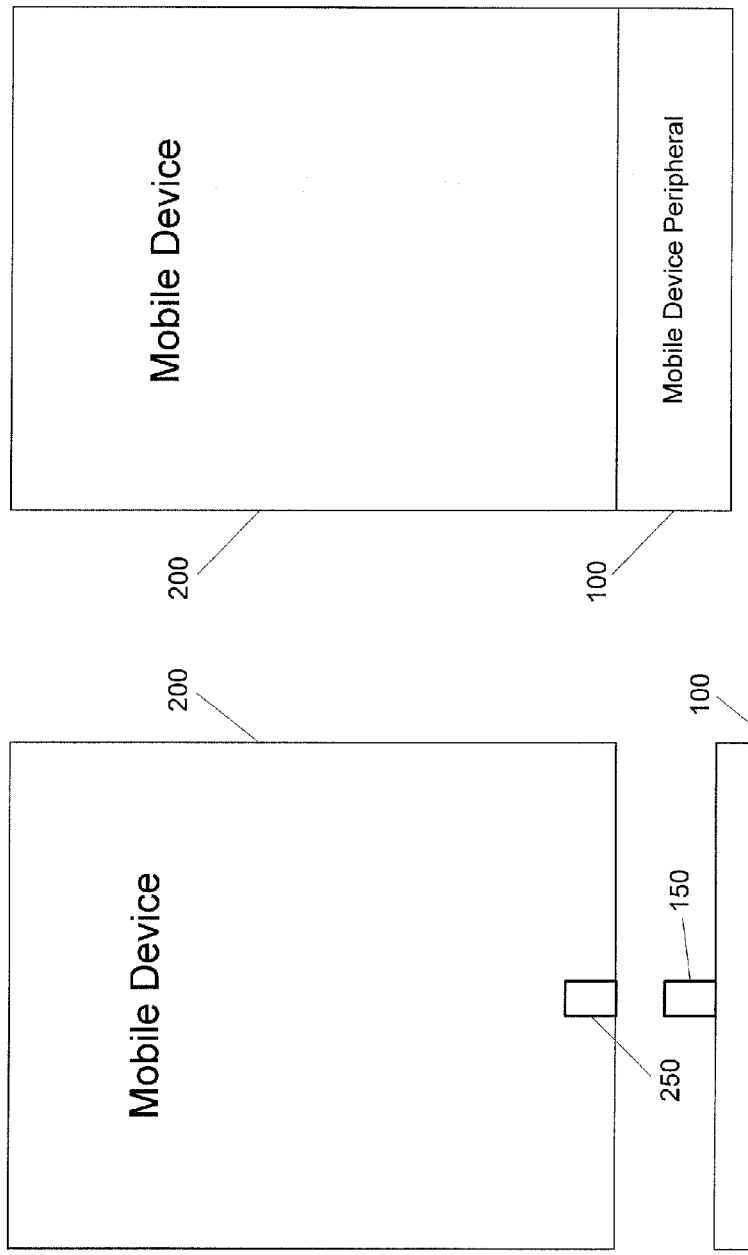
FIGS. 4A and 4B are illustrations of an embodiment in which a housing of a mobile device peripheral is configured to contact only one surface of a mobile device.

In the above paragraph, the mobile device peripheral 100 took the form of a case that physically contacted at least part of each of the surfaces of the mobile device 200. In another embodiment, shown in FIGS. 4A and 4B, the mobile device peripheral 100 does not necessarily provide any protection to the mobile device 200, as it is designed primarily to be a physical attachment to the mobile device 200 and not a protective case. To make the physical attachment, the output port 150 of the mobile device peripheral 100 physically attaches to the mobile device's power/data connector input 250. So, instead of physically contacting at least part of each of the surfaces of the mobile device 200, the mobile device peripheral 100 in this embodiment contacts only one surface of the mobile device 200 (here, the bottom surface). Assuming the mobile device peripheral 100 is not too heavy, the physical connection of components 150, 250 can keep the mobile device peripheral 200 and mobile device 100 physically attached so they are carryable together as a single unit (see FIG. 4B).

Again, other types of mobile device peripheral housing configurations can be used with other forms of mobile devices. For example, when the mobile device is a wearable computer, such as wearable glasses or a watch, the housing can take the form of a nose pad or a watch bezel protector, respectively.

Referring back to the wireless memory sub-system 120, the wireless memory sub-system 120 of the mobile device peripheral 100 can take any suitable form but typically includes a wireless transceiver and a storage module. The wireless transceiver allows wireless data transmission for data to be stored in or retrieval from a memory of the storage module. Any suitable wireless technology, now existing or later developed, can be used, including, but not limited to, near-field communication (NFC), Bluetooth (including Bluetooth Low Energy (LE), Wi-Fi, Nike+, ANT, ANT+, ZigBee, Radio Frequency for Consumer Electronics (RF4CE), and Infrared Data Association (IrDA), Also, it should be noted that the wireless memory capacity of the mobile device peripheral 100 can be shared with other mobile devices (via a shared wireless network) even though the mobile device peripheral 100 is physically attached to only one mobile device. That is, in one embodiment, when the wireless memory sub-system 120 is powered up, other mobile devices with access to the wireless memory sub-system 120 can access the data stored therein.

Figure 5:
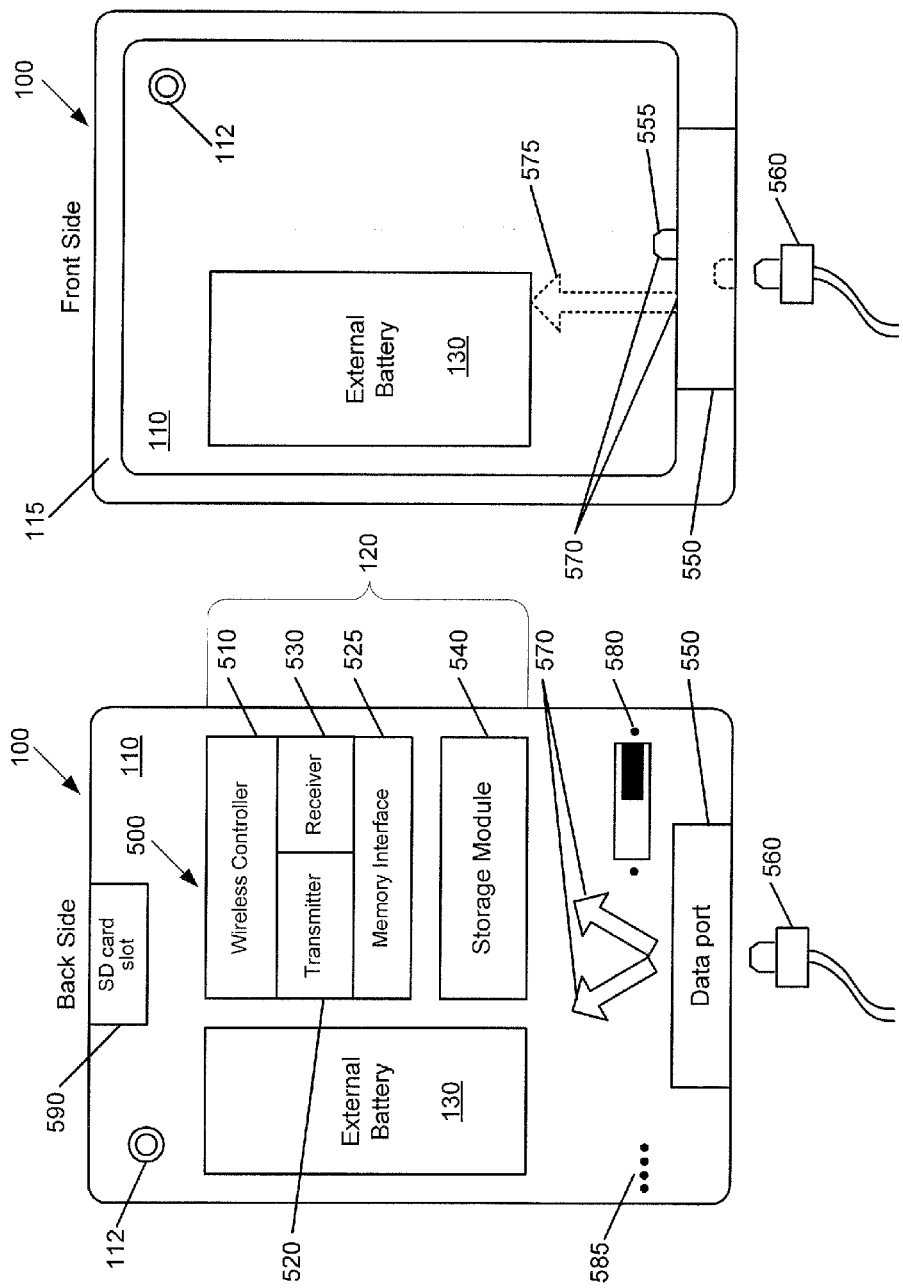
FIGS. 5A and 5B are illustrations of back and front sides of a mobile device peripheral of an embodiment.

FIGS. 5A and 5B are illustrations of back and front sides of a mobile device peripheral 100 of an embodiment that shows one example of a wireless memory sub-system 120 in more detail. The mobile device peripheral 100 in this embodiment takes the form of a smart phone case that covers the back surface of the phone (except for an opening 112 for the phone's camera lens), and the housing 110 has a lip 115 (FIG. 5B) that grasps the edges of the front surface of the phone. In this embodiment, the power source 130 takes the form of a battery (which is label "external" battery in FIGS. 5A and 5B because the battery is external to the mobile device 200). Also, the wireless memory sub-system 120 in this embodiment contains a wireless technology chip 500 (which contains a wireless controller 510, a transmitter 520 and receiver 530 (a "transceiver"), and a memory interface 525) and a storage module 540. The mobile device peripheral 100 in this embodiment also contains a data/power port 550 for connecting to a data/power connector 560 (i.e., the data/power port 550 is an input configured to receive a power connector 560), an output port 555 configured to connect to the power connector input 250 on the mobile device 200, a power splitter 570, a power switch 580, and indicators (e.g., LED lights) 585 for indicating when power is on, when the battery is charging, the amount of charge left on the battery, the mode of operation, etc. As noted above, in some embodiments, the power source 130 of the mobile device peripheral 100 can power both the wireless memory sub-system 120 and the mobile device 200. Accordingly, the power switch 580 on the mobile device peripheral 100 can allow which one(s), if any, of the wireless memory sub-system 120 and mobile device 200 to power from the mobile device peripheral's power source 130. The mobile device peripheral 100 also contains an optional removable memory card slot (e.g., an SD card slot (such as an SDHC/SDXC slot)) 590, so that a user can view and share the data on the SD card through the wireless memory sub-system 120 and/or expand the capacity of the mobile device peripheral 100.

Turning now to the components of the wireless memory sub-system 120, the wireless controller 510 controls the operations of the transmitter 520 and receiver 530 to wireless send and receive data. The memory interface 525 allows such data to be sent to and retrieved from the memory of the storage module 540. The memory interface can take any suitable form, such as, but not limited to, an eMMC host interface, a UFS interface, and a USB interface. The storage module 540 can also take any suitable form, and FIG. 6 shown one exemplary storage module 540 in more detail.

Figure 6:
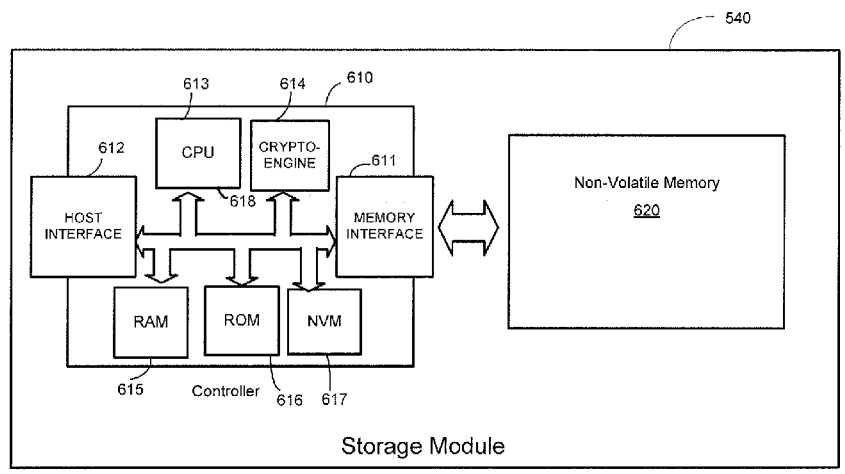
FIG. 6 is a block diagram of a storage module of an embodiment.

As shown in FIG. 6, the storage module 540 can contains a controller 610 and non-volatile memory 620. In this embodiment, the controller 610 comprises a host interface 612 for placing the storage module 540 in communication with the memory interface 520 of the wireless chip 500. As used herein, the phrase "in communication with" (or "operatively in communication with") could mean directly in communication with or indirectly in communication with through one or more components, which may or may not be shown or described herein. The controller 610 also comprises a central processing unit (CPU) 613, an optional hardware crypto-engine 614 operative to provide encryption and/or decryption operations, read access memory (RAM) 615, read only memory (ROM) 616 which can store firmware for the basic operations of the storage module 540, and a non-volatile memory (NVM) 617 which can store a device-specific key used for encryption/decryption operations, when used. The controller 610 can be implemented in any suitable manner. For example, the controller 610 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. Also, some of the components shown as being internal to the controller 610 can also be stored external to the controller 610, and other component can be used. For example, the RAM 615 (or an additional RAM unit) can be located outside of the controller die and used as a page buffer for data read from and/or to be written to the memory 620.

The non-volatile memory 620 can also take any suitable form. For example, in one embodiment, the non-volatile memory 620 takes the form of a solid-state (e.g., flash) memory and can be one-time programmable, few-time programmable, or many-time programmable. The non-volatile memory 120 can also use single-level cell (SLC) or multiple-level cell (MLC). The non-volatile memory 120 can take the form of NAND Flash memory or of other memory technologies, now known or later developed.

The storage module 540 can be embedded in the mobile device peripheral 100. However, by embedding the storage module 540 in the mobile device peripheral 100, the storage module cannot be swapped out and put into a different mobile device peripheral (e.g., when the user buys a new mobile device with different dimensions and needs to buy a new case or wants to share the memory). Alternatively, the storage module 540 can be removable from the mobile device peripheral 100, such as when the storage module 540 takes the form of a removable memory card (e.g., an SD card or a microSD card). The advantage of using a removable storage module, such as a memory card, is that the user can move the card to a new case (sold without memory) when he buys one, instead of having to buy a more expensive case (sold with memory). Also, the user would be able to move the card between devices (e.g., between a mobile phone and a camera) to share data. If desired, the app 225 on the mobile device 200 can be designed to work with removable memory cards from only certain manufacturer(s). (The app 225 can be provided by the same manufacturer of the mobile device peripheral 100, such that the user downloads the app 225 onto his mobile device 200 to use the mobile device peripheral 100 with his mobile device 200.)

It should also be noted that even when the storage module 540 takes the form of a removable memory card, the communication of data to and from the card to the mobile device 200 is still done wirelessly via the wireless technology chip 500 and not through the wired power/data connector input 250 of the mobile device 200. This is significant because some mobile devices do not support memory expansion through the power/data port. For example, Apple's iPad does not support memory expansion by connecting through the power/data port. Also, for those mobile devices that support memory expansion through data ports, it is common for the manufacturer of those mobile devices to deliberately throttle the maximum speed of data transfer, which can result in bad user experience. In contrast, with the mobile device peripheral 100 of these embodiments, the data transfer rate can be significantly higher.

Figure 7:
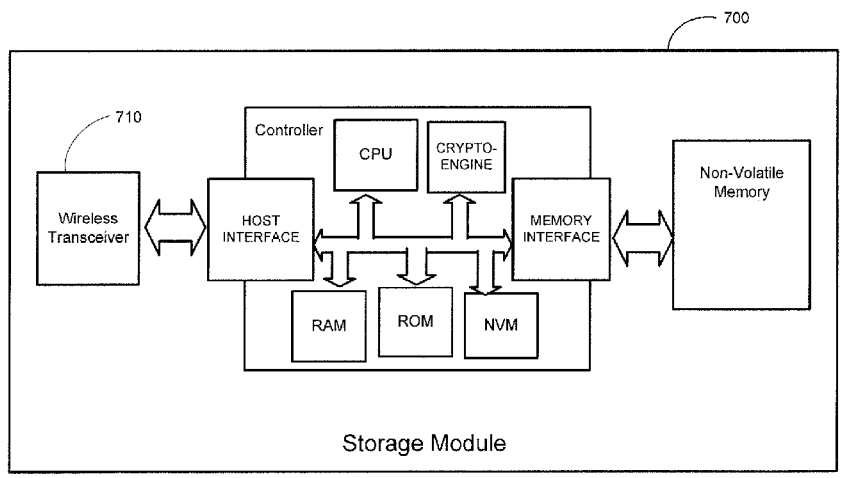
FIG. 7 is a block diagram of a storage module of an embodiment in which the storage module has its own wireless transceiver.

In the embodiment shown in FIGS. 5A and 5B, the wireless memory sub-system 120 contained both a wireless technology chip 500 with a wireless transceiver 520, 530 and a separate (embedded or removable) storage module 540. In another embodiment, shown in FIG. 7, a storage module 700 (e.g, a micro/miniSD or SD card) is provided with its own wireless transceiver 710. Accordingly, a wireless technology chip in the mobile device peripheral 100 is not needed. Like the other storage module 600, this storage module 700 can be embedded in or removable from the mobile device peripheral 100. One example of a removable storage module with its own wireless transceiver is an Eye-Fi SD card. Using a storage module 700 with its own wireless transceiver 710 allows a user to use the storage module 700 with other mobile devices the user currently has or will purchase in the future. However, a storage module 700 that is proprietary to a specific storage module manufacturer can be used, which may limit the usability of the storage module outside of the mobile device peripheral 100.

Returning back to FIGS. 5A and 5B, FIG. 5A also shows an optional removable memory card slot 590 (e.g., an SD card or a microSD card). It should be noted that this slot 590 is separate from the wireless memory sub-system 120. Accordingly, while a hardwired connection can be used to transfer data from the card in the slot 590 to the storage module of the wireless memory sub-system 120, data from the card in the removable memory card slot 590 is not communicated to the mobile device 100 over a hardwired connection. That is, data communication with the mobile device 100 is still preferably performed wirelessly via the wireless memory sub-system 120 to avoid the issued discussed above.

As shown in FIGS. 5A and 5B, the mobile device peripheral 100 also contains a data/power port 550 for connecting to a data/power connector 560 (i.e., the data/power port 550 is an input configured to receive a power connector 560) and an output port 555 configured to connect to the power connector input 250 on the mobile device 200. In this way, the data port 550 can act as a "pass through" to data being sent over the data/power connector 560 to the mobile device 200 (such as when the mobile device 200 is synched with a computer). However, since both the mobile device peripheral 100 and the mobile device 200 have batteries, the mobile device peripheral 100 can have a power splitter 570, so that power coming into the data port 550 of the mobile device peripheral 100 can be split to charge both the battery 130 of the mobile device peripheral 100 (illustrated with arrow 575 in FIG. 5B) and the battery 240 of the mobile device 200. This provides an advantage over portable, wireless flash drives that, while usable with a mobile device, require separate charging, which may be inconvenient to some users.

Figure 8:
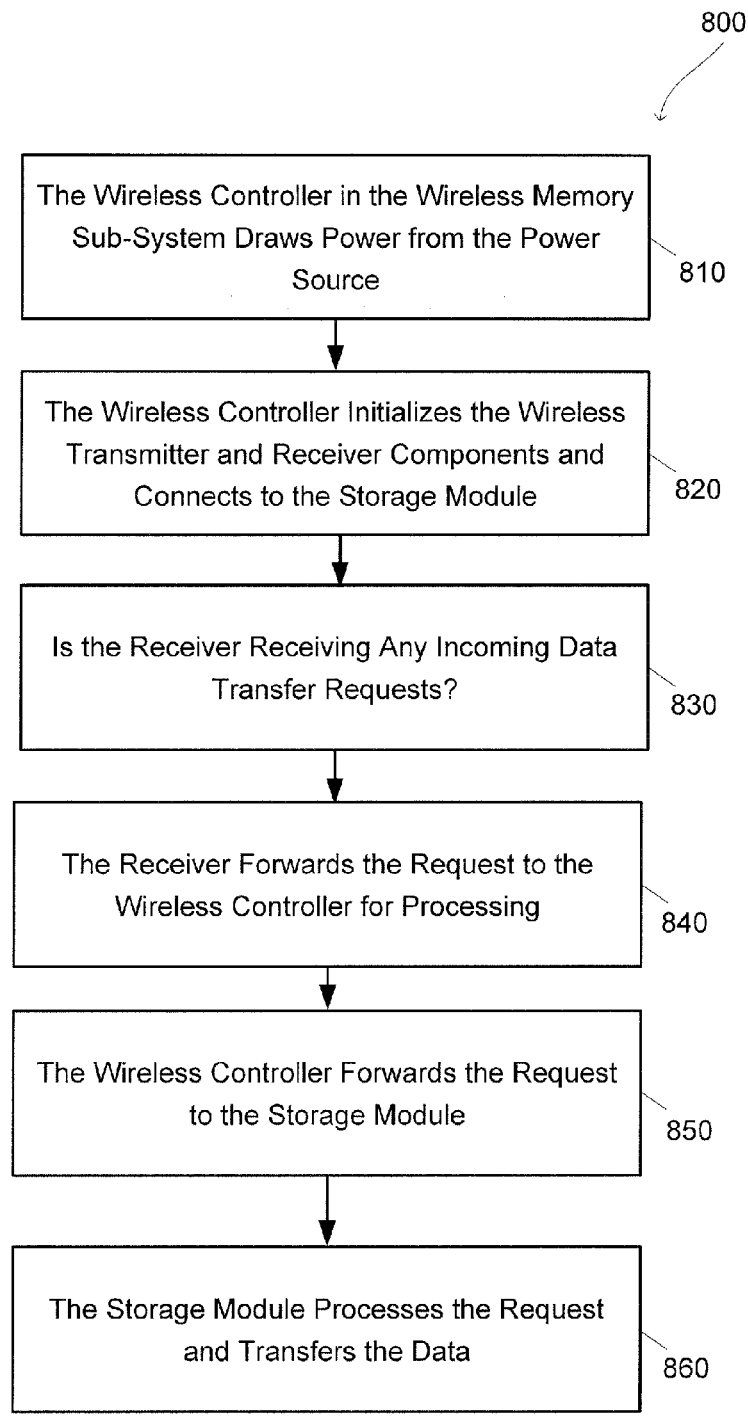
FIG. 8 is a flow chart of a method of an embodiment for a mobile device peripheral to communicate with an app on a mobile device.
Figure 9:
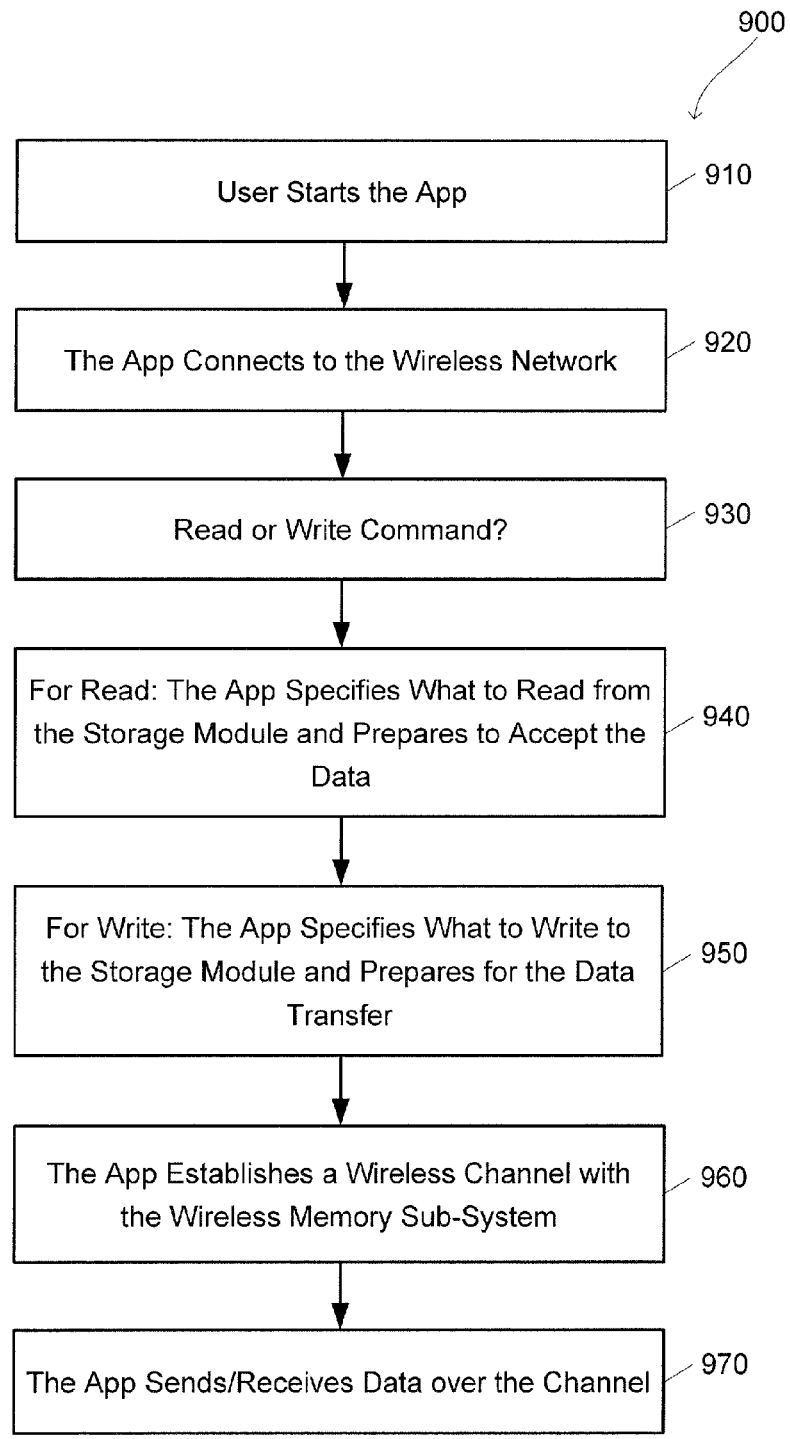
FIG. 9 is a flow chart of a method of an embodiment for an app on a mobile device to communicate with a mobile device peripheral.

As noted above, the wireless memory sub-system 120 of the mobile device peripheral 100 can carry out wireless data communications (i.e., wirelessly communicate data) with the mobile device 200 in any suitable manner. In one embodiment, the wireless memory sub-system 120 of the mobile device peripheral 100 wirelessly communicates with an app 225 on the mobile device 200 via the mobile device's wireless transceiver 230 (see FIG. 2). FIGS. 8 and 9 are flowcharts 800, 900 of exemplary methods that the wireless memory sub-system 120 and app 225 can use to communicate with one another.

As shown in the flowchart 800 in FIG. 8, the wireless controller 510 in the wireless memory sub-system 120 draws power from the power source 130 (act 810). Then, the wireless controller 510 initializes the wireless transmitter and receiver components 520, 530 and connects to the storage module 540 (act 820). Next, it is determined whether the receiver 530 is receiving any incoming data transfer requests from the app 255 on the mobile device 200 (act 830). If the receiver 530 received a request, the receiver 530 forwards the request to the wireless controller 510 for processing (act 840). Then, the wireless controller 510 forwards the request to the storage module 540 (act 850), and the storage module 540 processes the request and transfers the data (if any) through the wireless transmitter 520 to the app 225 (or other requestor) (act 860).

Regarding the actions by the app 225, the flowchart 900 in FIG. 9 shows that, after the user starts the app 225 (act 910), the app 225 connects to the wireless network set-up by the wireless memory sub-system 120 in the mobile device peripheral 100 (act 920). The app 225 then can perform a read or write command (act 930). For a read command, the app 225 specifies what to read from the storage module 520 in the mobile device peripheral 100 and prepares to accept the data (act 940). For a write command, the app 225 specifies what to write to the storage module 520 in the mobile device peripheral 100 and prepares for the data transfer (act 950). The app 225 then establishes a wireless channel with the wireless memory sub-system 120 (act 960) and sends/receives data over the channel (act 970). Any suitable encryption technique can be used for secure data transmission and to prevent non-authorized entities from accessing the data stored in the storage module 540.

Many alternatives can be used with these embodiments. For example, in one alternate embodiment, the wireless memory sub-system 120 of the mobile device peripheral 100 is configured to operate in a plurality of power modes, such that, when the user does not use the wireless memory sub-system 120, it can go into a different power mode. The various power modes can include one or more of the following modes: low power mode, smart power off mode, variable wireless strength mode, and power off mode. In the low power mode, the wireless memory sub-system 120 can go into a low power mode when not in use, thereby saving battery. In the smart power off mode, the app 225 (or other component) on the mobile device 200 can put the wireless memory sub-system 120 into a no power mode. When the app 225 would like transfer data, it can request the wireless memory sub-system 120 return to regular power mode and switch on the memory as well. The variable wireless strength mode recognizes that the primary user of the wireless memory sub-system 120 is the mobile device 200, which is physically very close to the wireless memory sub-system 120. So, the wireless signal strength of the wireless memory sub-system 120 can be reduced, hence reducing power consumption. When a second device connects, the wireless strength can be increased, thereby providing desirable wireless transfer speeds. Finally, in power off mode, when the user knows that he does not want to use the wireless memory sub-system 120, the user can manually switch off the wireless memory sub-system 120. As noted above, where the power source 130 of the mobile device peripheral 100 can power both the wireless memory sub-system 120 and the mobile device 200, the power switch on the mobile device peripheral 100 can allow which one(s), if any, of the wireless memory sub-system 120 and mobile device 200 to power from the mobile device peripheral's power source 130.

There are several advantages associated with these embodiments. For example, the wireless memory access provided by the mobile device peripheral 100 allows a user to expand the memory capacity of his mobile device without upgrading to a new mobile device or storing data on the cloud. Also, because the mobile device peripheral 100 physically attaches to the mobile device and is carried along with it as a single unit, the mobile device peripheral 100 of these embodiments has advantages over tradition portable, wireless flash drives. For example, although portable, some users may find it inconvenient to carry a wireless flash drive with them. Plus, while many users always take their mobile phones with them, they may not remember to bring along their wireless flash drive. Because the mobile device peripheral 100 physically attaches to the mobile device 200 in this embodiment, there is no need for the user to remember that he has to carry the peripheral 100 with him. Also, since both the wireless flash drive and mobile device need to be charged, some users may find the separate and periodic charging of two devices to be inconvenient (in contrast to one of the embodiments described above, in which charging the mobile device peripheral 100 also charges the mobile device 200). Finally, the wireless memory capacity of the mobile device peripheral 100 can be shared with other mobile devices (via a shared wireless network) even though the mobile device peripheral 100 is physically attached to one mobile device.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A mobile device peripheral comprising:
    a wireless memory sub-system configured for carrying out wireless data communications with a mobile device;
    a battery configured to provide power to the wireless memory sub-system; and
    a housing configured to hold the wireless memory sub-system and battery, and further configured to physically attach the mobile device peripheral to the mobile device so that the mobile device peripheral and mobile device are carryable together as a single unit;
    wherein the mobile device contains its own battery, and wherein the mobile device peripheral further comprises:
    an input configured to receive a power connector;
    an output configured to connect to a power connector input on the mobile device; and
    a splitter configured to split power received from the power connector to both the battery of the mobile device peripheral and the output, wherein power received from the power connector charges both the battery of the mobile device peripheral and the battery of the mobile device.

2. The mobile device peripheral of claim 1, wherein the storage module is embedded in the mobile device peripheral.

3. The mobile device peripheral of claim 1, wherein the storage module is removable from the mobile device peripheral via a memory card slot.

4. The mobile device peripheral of claim 1, wherein the wireless memory sub-system comprises a storage module having its own internal wireless transceiver.

5. The mobile device peripheral of claim 1, wherein the wireless data communications with the mobile device are provided to and from an application running on the mobile device.

6. The mobile device peripheral of claim 1, wherein the wireless memory sub-system is configured to operate in a plurality of power modes.

7. The mobile device peripheral of claim 1, wherein the mobile device peripheral is embodied in a mobile device case or cover.

8. The mobile device peripheral of claim 1, wherein the housing is configured to contact at least part of each of the surfaces of the mobile device.

9. The mobile device peripheral of claim 1, wherein the housing is configured to contact only one surface of the mobile device.

10. The mobile device peripheral of claim 1, wherein the battery is also configured to provide power to the mobile device.

11. The mobile device peripheral of claim 1, wherein the wireless memory sub-system further comprises a wireless transceiver and a storage module.

12. A method for communicating data between a mobile device peripheral and a mobile device, the method comprising:

performing the following in a mobile device peripheral comprising a wireless memory sub-system, a battery powering the wireless memory sub-system, and a housing physically attached to a mobile device so that the mobile device peripheral and mobile device are carryable together as a single unit:
  receiving a request to carry out wireless data communications with a mobile device;
  if the request is a read request, wirelessly sending data stored in the wireless memory sub-system to the mobile device; and
  if the request is a write request, wirelessly receiving data from mobile device and storing the data in the wireless memory sub-system;

wherein the mobile device contains its own battery, and wherein the mobile device peripheral further comprises:

an input configured to receive a power connector;

an output configured to connect to a power connector input on the mobile device; and a splitter configured to split power received from the power connector to both the battery of the mobile device peripheral and the output, wherein power received from the power connector charges both the battery of the mobile device peripheral and the battery of the mobile device.

13. The method of claim 12, wherein the wireless memory sub-system comprises a storage module having its own internal wireless transceiver.

14. The method of claim 12, wherein the wireless memory sub-system is configured to operate in a plurality of power modes.

15. The method of claim 12, wherein the mobile device peripheral is embodied in a mobile device case or cover.

16. The method of claim 12, wherein the housing is configured to contact at least part of each of the surfaces of the mobile device.

17. The method of claim 12, wherein the housing is configured to contact only one surface of the mobile device.

18. The method of claim 12, wherein the battery is also configured to provide power to the mobile device.

19. The method of claim 12, wherein the wireless memory sub-system comprises a wireless transceiver and a storage module.

20. The method of claim 19, wherein the memory is embedded in the mobile device peripheral.

21. The method of claim 19, wherein the memory is removable from the mobile device peripheral via a memory card slot.

* * * * *